(12) United States Patent
Voelker et al.

(10) Patent No.: US 12,147,558 B2
(45) Date of Patent: Nov. 19, 2024

(54) NATIVE MULTI-TENANT ENCRYPTION FOR DATABASE SYSTEM

(71) Applicant: SAP SE, Walldorf (DE)

(72) Inventors: Patrick Voelker, Mannheim (DE); Holger Mack, Karlsruhe (DE); Meinolf Block, Heidelberg (DE); Thorsten Glebe, Leimen (DE); Mihnea Andrei, Issy les Moulineaux (FR); Yong Sik Kwon, Seoul (KR); Dirk Thomsen, Heidelberg (DE); Martin Schindewolf, Walldorf (DE); Martin Kittel, Berlin (DE); Myung Sun Park, Seoul (KR); Beomsoo Kim, Seoul (KR); Martin Heidel, Walldorf (DE); Christian Bensberg, Heidelberg (DE); Fabian Garagnon, Berlin (DE); Michael Muehle, Walldorf (DE); Sergej Hardock, Herborn (DE); Johannes Beigel, Rauenberg (DE); Sascha Zorn, Schwetzingen (DE); Christoph Hohner, Mannheim (DE); Andreas Hartel, Heidelberg (DE)

(73) Assignee: SAP SE, Walldorf (DE)

( * ) Notice: Subject to any disclaimer, the term of this patent is extended or adjusted under 35 U.S.C. 154(b) by 274 days.

(21) Appl. No.: 17/968,136

(22) Filed: Oct. 18, 2022

(65) Prior Publication Data
US 2023/0409731 A1 Dec. 21, 2023

Related U.S. Application Data

(60) Provisional application No. 63/352,779, filed on Jun. 16, 2022, provisional application No. 63/352,811, filed on Jun. 16, 2022.

(51) Int. Cl.
G06F 21/00 (2013.01)
G06F 21/62 (2013.01)
H04L 9/08 (2006.01)

(52) U.S. Cl.
CPC ........ *G06F 21/6227* (2013.01); *H04L 9/0822* (2013.01); *H04L 9/0825* (2013.01); *H04L 9/0891* (2013.01)

(58) Field of Classification Search
None
See application file for complete search history.

(56) References Cited

U.S. PATENT DOCUMENTS

2020/0259896 A1* 8/2020 Sachs ................ H04W 56/0065
2022/0266446 A1* 8/2022 Cristache ................ G06N 5/04

* cited by examiner

*Primary Examiner* — Andrew J Steinle
(74) *Attorney, Agent, or Firm* — Buckley, Maschoff & Talwalkar LLC

(57) ABSTRACT

A database system includes a persistent storage system, a memory storing metadata defining a tenant object and a plurality of database artifacts, a first instance of the tenant object, the first instance associated with a first plurality of the database artifacts including first data associated with the first instance of the tenant object, and a second instance of the tenant object, the second instance associated with a second plurality of the database artifacts including second data associated with the second instance of the tenant object. A processing unit is to execute program code of a database instance to cause the database system to encrypt the first data associated with the first instance of the tenant object using a first public encryption key and store the encrypted first data in the persistent storage system, and encrypt the second data associated with the second instance of the tenant object using a second public encryption key and store the encrypted second data in the persistent storage system.

20 Claims, 8 Drawing Sheets

NATIVE MULTI-TENANT ENCRYPTION FOR DATABASE SYSTEM

CROSS-REFERENCE TO RELATED APPLICATIONS

The present application claims priority to U.S. Provisional Patent Application Nos. 63/352,779 and 63/352,811, filed Jun. 16, 2022, the entire contents of which are incorporated by reference herein for all purposes.

BACKGROUND

Multi-tenancy is a software architecture pattern which facilitates the sharing of computing resources among disparate groups of users. For example, a single multi-tenant application (e.g., a Software-as-a-Service (SaaS) application) may serve multiple end user groups (i.e., customers) within a single software instance. Such a software instance uses a much smaller computing resource footprint than would be required to provision one software instance per customer. Multi-tenancy can therefore provide substantial cost benefits.

The data of each customer in a multi-tenant architecture is typically mapped to a corresponding tenant in the underlying data layer. This mapping allows for logical separation of the data within the data layer and facilitates access thereto by the multi-tenant application. In some multi-tenant architectures, the data of each tenant is managed by a different database instance executing within a same computing system (e.g., a rack server). These architectures provide excellent separation of tenant data but it may be cost-inefficient in some scenarios to require a full database instance per tenant. For example, a smallest database instance may consume 32 Gb of memory, which may represent significantly more computing resources than should be required by a small tenant.

Other multi-tenant data architectures use a single database instance to manage the data of multiple tenants. Since the data in such an architecture is not physically separated, the multi-tenant application is responsible for storing and managing the data in a tenant-aware manner. For example, a database system may use one schema of a single instance for all tenants, where the data of each tenant is partitioned via a discriminating column. The multi-tenant application uses the values of the discriminating column to identify the data belonging to specific tenants. In another example, the multi-tenant application associates a dedicated schema to each tenant. In either case, the database system is unaware of the existence of the multiple tenants and operates in the same manner as if it were being accessed by a single-tenant application.

Data volumes, log segments and backups of a database system may be persisted to disk. This data, which includes all the customer (tenant) data stored in the database system as well as data and metadata not specific to any customer, is encrypted using a key associated with the database system (i.e., a data encryption key) and prior to storage on disk. The data encryption key is generated by a provider of the database system and its corresponding decryption key is stored local to the database.

The decryption key may be encrypted using a second key (i.e., a key encryption key) and stored locally in an encrypted format. The database system provider may store a decryption key corresponding to the second key in a secure key vault. To decrypt and use any of persisted data, the database system first requests decryption of the locally-stored data decryption key. The key decryption key stored in the key vault is used to decrypt the locally-stored data decryption key, and the thus-decrypted data decryption key is then used to decrypt the desired stored data.

Database systems advantageously provide encryption, backup/restore, copying, and moving of the data stored therein. What is needed are database systems which provide such database-instance-level features on a tenant-level.

DETAILED DESCRIPTION

Figure 1:
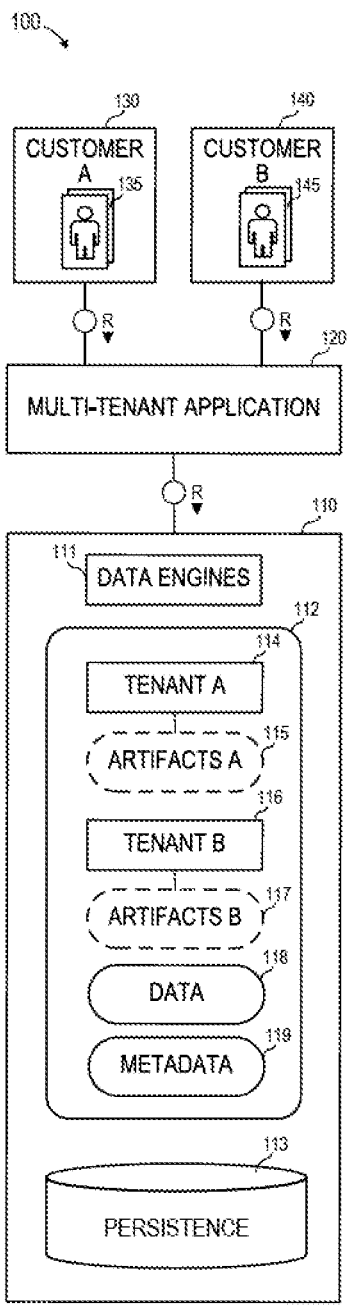
FIG. 1 is a block diagram of a database system providing native multi-tenancy according to some embodiments.

The following description is provided to enable any person in the art to make and use the described embodiments. Various modifications, however, will be readily-apparent to those in the art.

According to the above examples, a database provider is capable of decrypting persisted encrypted database data of all database customers. However, it is desirable for a customer to provide and manage the keys used for encrypting its data. Primarily, a customer may desire the ability to revoke access to their keys such that the database provider will thereafter be unable to access their encrypted data.

In a multi-tenant scenario, where the database system may include data of two or more customers, revocation of key access by a particular customer should only render the data of the particular customer inaccessible. That is, encryption and decryption functionality should remain operable for other customers' data and for customer-unspecific data and metadata. Embodiments therefore introduce a database-native, tenant-level encryption scheme which is orthogonal to existing encryption mechanisms for data volumes, log segments and backup.

Generally, all database system data not actively being processed (i.e., data "at rest") resides encrypted in persistent storage, where the data of each customer is encrypted with its own customer-specific key. Such encryption may prevent data leakage and provide defense in case of a third-party breach. The keys may be customer-supplied and controlled to prevent access to customer data by the database provider. Such customer control may decrease potential liability of the database provider if confidential customer data becomes public and the source of data leakage cannot be identified.

According to some embodiments, a native multi-tenant database system includes a database-level tenant object (e.g., a database catalog object) which facilitates the implementation of multi-tenant architectures on the application layer. A tenant object is a logical collection of data as well as metadata artifacts which have been assigned to a tenant. Tenants may be exposed as first-class database objects (i.e., having an identity independent of any other database entity).

The database artifacts assigned to a particular instantiation of a tenant object (i.e., a particular tenant) may include, but are not limited to, data of one or more schemas, tables, and partitions, as well as metadata defining views on the tenant's tables, virtual tables, caches, remote sources, workload classes used to govern resource usage for the tenant's database objects, and database users. Advantageously, the lifecycle of a tenant may be decoupled from the lifecycle of its assigned database artifacts. However, in some embodiments, dropping of a tenant from a database instance results in dropping of artifacts assigned thereto, so long as those artifacts are not assigned to another tenant of the database instance.

A native multi-tenant database system may include one or more database instances, the data of all tenants, and the engines for processing the data. The single system also includes a single persistence for the data of all the tenants. By allowing multiple, independent tenants, or rather customers, to be hosted on a single instance and share computing resources, deployment of a new tenant to a database instance is associated with a near-zero marginal cost. The latter comes at a cost of lower physical isolation between the different tenants. Moreover, embodiments enable a pay-per-use model having a finer granularity than that required for provisioning a separate database instance.

In a case that a tenant requires stronger data isolation than the logical isolation described above, the tenant may be deployed as the sole tenant of a database instance. Since such an arrangement would not fully partake of the cost benefits of multi-tenancy, the price charged to the sole tenant may be higher than otherwise.

A database system according to some embodiments supports requests for tenant-level database operations which would otherwise need to be implemented by the application. These operations may include tenant creation, tenant drop, tenant move, tenant restore from backup, tenant clone, tenant resize and tenant resource limitation. In some embodiments, a shared service exposes APIs (e.g., via REST) which are called by muti-tenant applications to request these tenant-level operations from the database system using, for example, an associated tenant id. Current database system DDLs may be extended to support the assignment of database artefacts to tenants.

A tenant-level clone operation may be useful to onboard a new customer in order to provide template data to the new customer. The clone operation is a form of tenant creation.

Some embodiments provide tenant-level recovery of point-in-time data. This recovery does not recover the data of all customers (i.e., the data of the entire database instance) but rather the data of a specific tenant. For example, if one tenant's data becomes corrupted, only the data of the corrupted tenant needs to be recovered.

According to some embodiments, one user can only define the artifacts assigned to the tenant and another user is only allowed to perform clone/move operations. Otherwise, a malicious administrator could create a tenant, assign objects to the tenant, and clone the tenant's content to another system that is fully controlled by the malicious administrator. Additionally, a malicious administrator could drop a tenant and delete all objects assigned to that tenant.

Embodiments may provide tenant-level encryption to encrypt data of the tables that are assigned to a tenant. This functionality encrypts each tenant's persisted data with a separate tenant-specific key, despite the fact that this data is not physically segregated from other tenants' data within the database instance. Embodiments of this functionality are described in detail below.

Shared data and metadata (e.g., database catalog, users, shared containers) may be encrypted in the persistence layer using a database instance-specific key. In contrast, prior systems offered encryption of the entire persistence layer using a single database instance-specific key.

The location of a tenant, i.e., the database instance in which it and its artifacts resides, is one of the properties of a tenant and is determined by the multi-tenant application. The application may also determine to move a tenant from one database instance to a different database instance as it grows or shrinks in data size and resource consumption. This move operation provides elasticity in cloud-based implementations and is preferably performed online to avoid downtime. Tenant-specific security properties such as encryption should be preserved during a tenant move operation.

Database resource consumption quotas may be defined at the tenant-level. These quotas may address "noisy neighbor" issues. A tenant session variable may define tenant-specific usage limits for memory, threads, network I/O, disk I/O, disk size, etc., depending on the ability of the technical infrastructure to measure and control such usage.

FIG. 1 is a block diagram of system 100 according to some embodiments. The illustrated elements of system 100 and of all other architectures depicted herein may be implemented using any suitable combination of computing hardware and/or processor-executable program code that is or becomes known. Such combinations may include one or more programmable processors (microprocessors, central processing units, microprocessor cores, execution threads), one or more non-transitory electronic storage media, and processor-executable program code. In some embodiments, two or more elements of system 100 are implemented by a single computing device, and/or two or more elements of system 100 are co-located. One or more elements of system 100 may be implemented as a cloud service (e.g., Software-as-a-Service, Platform-as-a-Service) using cloud-based resources, and/or other systems which apportion computing resources elastically according to demand, need, price, and/ or any other metric.

Database instance 110 provides native multi-tenancy according to some embodiments. Database instance 110 may be provisioned on any suitable combination of hardware and software, including one or more computer servers or virtual machines. In some embodiments, database instance 110 comprises a containerized application executing within a software container. Such containers may be implemented by one or more nodes of a cluster (e.g., a Kubernetes cluster) as is known in the art.

Database instance 110 includes data engines 111 for processing data and metadata stored in volatile (e.g., Random Access) memory 112. Memory 112 includes data 118 and metadata 119 of all tenants assigned to database instance 110. Each tenant of system 100 will be described as corresponding to a customer, where a customer may be a company, a division, a workgroup, or any other group of users. A tenant may correspond to a particular cloud resource/ service subscription of a given customer. In this regard, a customer may be associated with more than one subscription and therefore more than one tenant.

In particular, memory 112 includes tenant instance 114 of tenant 'A' and tenant instance 116 of tenant 'B'. Each tenant instance 114 and 116 is an instance of a tenant object defined in metadata 119. Tenant instances 114 and 116 may be stored within data 118 but are depicted separate therefrom for ease of understanding.

As described above, each tenant instance 114 and 116 is a collection of database artifacts. The artifacts assigned to each tenant instance 114 and 116 are stored among data 118 and metadata 119. Accordingly, artifacts A 115 assigned to tenant instance 114 and artifacts B 117 assigned to tenant instance 116 are depicted using dashed lines to represent references to database artifacts of data 118 and metadata 119. The database artifacts assigned to a tenant instance may include, for example, one or more schemas, tables, and partitions. The database artifacts may also include metadata defining views on the tenant's tables, virtual tables, caches, remote sources, workload classes used to govern resource usage for the tenant's database objects, and database users.

Database instance 110 also includes persistence 113 for persisting data 118 and metadata 119 of all assigned tenants (as well as separately-depicted instances 114 and 116). Persistence 113 may be implemented using any persistent data storage system that is or becomes known, including but not limited to distributed data storage systems. Persistence 113 may persist transaction logs and other database artifacts as is known in the art.

Database instance 110 thereby provides a single data server including the data and metadata of all tenants of the database instance, the engines for processing the data, and a single persistence for the data and metadata. Hosting multiple independent tenants on such a single database instance facilitates sharing of computing resources at near-zero marginal cost.

Multi-tenant application 120 may comprise a SaaS application but embodiments are not limited thereto. Multi-tenant application 120 may be provisioned on one or more computer servers or virtual machines and may comprise a containerized application executing within a software container. Multi-tenant application 120 issues queries (e.g., SQL, MDX) to database instance 110 based on input received from users 135 and 145 of customers 130 and 140, respectively.

It will be assumed that customer A 130 corresponds to tenant A 114 of database instance 110 and that customer B 140 corresponds to tenant B 116 of database instance 110. Upon receipt of input from a user 135 of customer A 130, multi-tenant application 120 may transmit a query to database instance 110 which indicates an association with tenant A 114. Similarly, upon receipt of input from a user 145 of customer B 140, multi-tenant application 120 may transmit a query to database instance 110 along with an indication that the query is associated with tenant B 116. Upon receipt of a query from multi-tenant application 120, database instance 110 processes the query using data engines 111 and the artifacts assigned to the tenant with which the query is associated.

Accordingly, multi-tenant application 120 is able to determine the tenant which corresponds to a user from whom input is received. For example, each user may logon to multi-tenant application 120 using a tenant-specific subscription. Multi-tenant application 120 therefore associates a user with the tenant of the subscription under which the user has logged on. In another example, communications between users and multi-tenant application 120 may include tenant-identifying tokens.

Multi-tenant application 120 is also aware of which tenants are placed on which database instances. In this regard, multi-tenant application 120 may request provisioning of database instances and creation of tenants on provisioned database instances. Upon receiving input from a user associated with a given tenant, multi-tenant application 120 is able to determine the database instance which includes the given tenant and to which a corresponding query should therefore be directed.

Multi-tenant application 120 may request provisioning of database instances and creation of tenants on provisioned database instances based on input received by a customer key user. According to some embodiments, multi-tenant application 120 calls a provisioning service (not shown in FIG. 1) to provision a new database instance. Multi-tenant application 120 may also call REST APIs of a tenant lifecycle management service (not shown in FIG. 1), to create a tenant on a database instance, drop a tenant from a database instance, move a tenant to a database instance, recover a tenant from a database backup, copy a tenant to a database instance (i.e., create as a template), resize a tenant on a database instance, define tenant resource limits on a database instance, etc.

Figure 2:
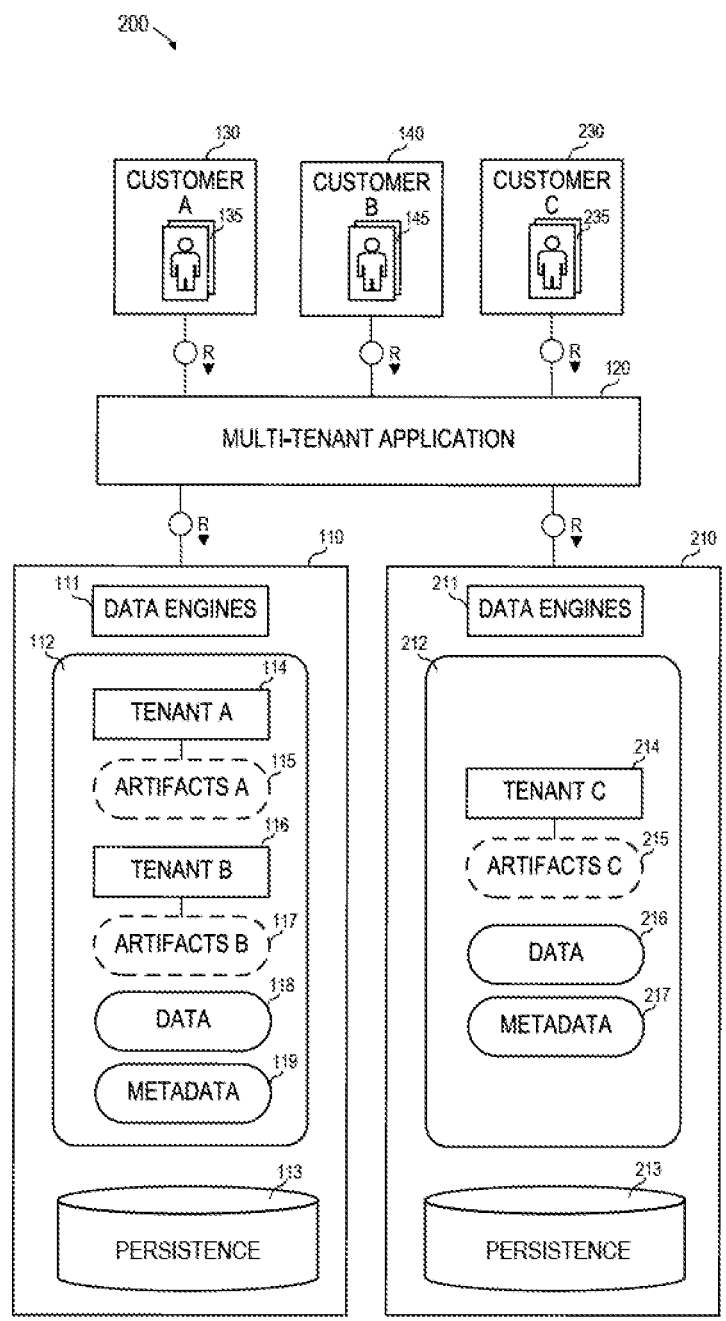
FIG. 2 is a block diagram of a database system providing native multi-tenancy according to some embodiments.

FIG. 2 illustrates system 200 in which multi-tenant application 120 has requested provisioning of database instance 210 in addition to database instance 110. Database instance 210 includes its own data engines 211, memory 212 and persistence 213.

Multi-tenant application 120 has also requested creation of tenant C on database instance 210. Tenant C corresponds to customer C 230. Accordingly, memory 212 includes tenant object instance 214 of tenant C assigned to artifacts C 215. Artifacts C 215 comprise data and metadata stored in data 216 and metadata 217 of memory 212. Accordingly, upon receiving input from a user 235 of customer C 230, multi-tenant application 120 directs any resulting queries to database instance 210 because multi-tenant application 120 is aware that database instance 210 includes tenant C 214 corresponding to customer C 230.

According to some embodiments, each tenant is identified by a name that is unique within its own database instance. Therefore, tenant C 214 may be named tenant A because database instances 110 and 210 operate independently. A multi-tenant application may provision multiple database instances and provide elasticity to its tenants through tenant move operations. In such a case, the application should ensure that the movement of a tenant to a target database instance does not introduce tenant name conflicts on the target database instance.

Figure 3:
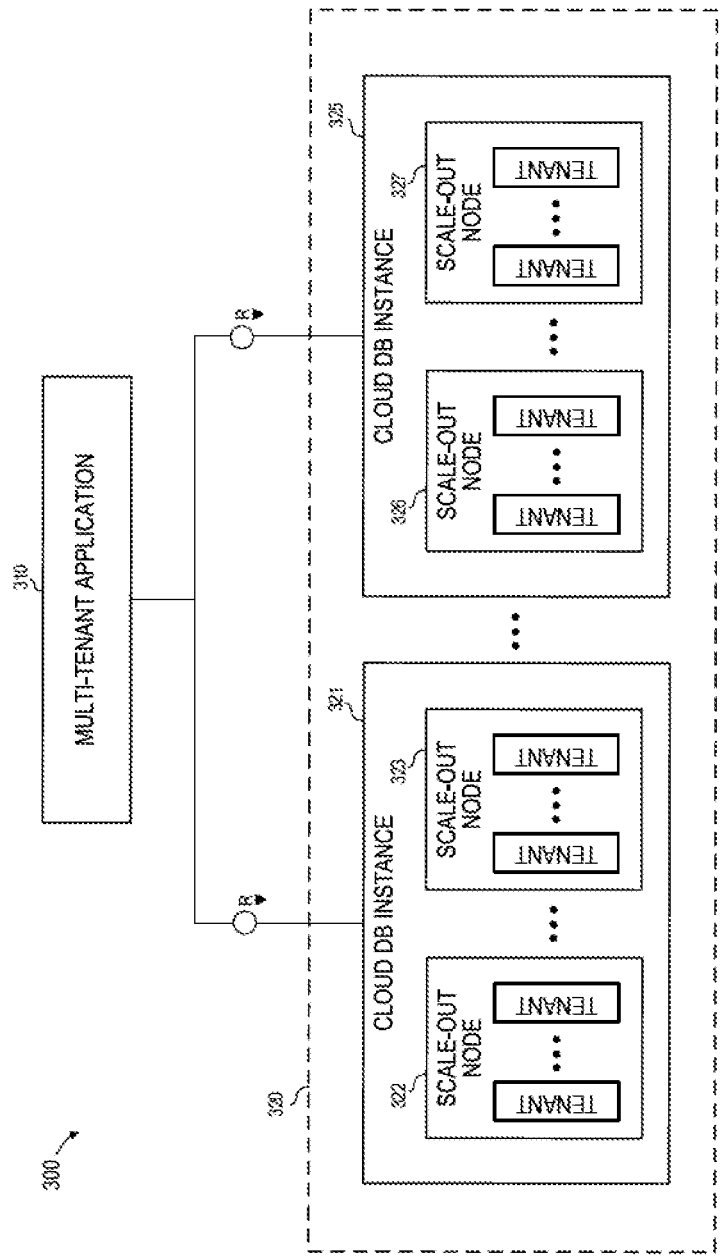
FIG. 3 is a block diagram of a cloud-based database architecture providing native multi-tenancy according to some embodiments.

FIG. 3 illustrates system 300 in which multi-tenant application 310 is associated with instance farm 320. Farm 320 includes several database instances including instances 321 and 325. Farm 320 may comprise execution environments on which multi-tenant application 310 may provision database instances and create tenants thereon.

Multi-tenant application 310 is aware of the database instances provisioned within farm 320 and of the tenants which are on each database instance. Each database instance of farm 320 is aware of its tenants and of the users, schemas and other metadata it stores. However, a given database instance of farm 320 is unaware of the tenants, schemas, etc. of other database instances of farm 320.

Multi-tenant application 310 may specify a memory size and a persistence size for each database instance of farm 320, and grow or shrink these sizes as desired. Multi-tenant application 310 may also create a tenant on a database instance of farm 320, specify an initial size thereof, and grow or shrink the tenant size as desired. As described above, multi-tenant application 310 may also drop a tenant from or move a tenant to a database instance.

Each database instance of system 300 may be executed by a cluster (e.g., a Kubernetes cluster). Each cluster may allow multi-tenant application 310 to provision scale-out nodes to provide additional computing resources to its database instance. Moreover, multi-tenant application 310 may be node-aware, allowing the movement of tenants between nodes of a same database instance or nodes of different database instances.

Figure 4:
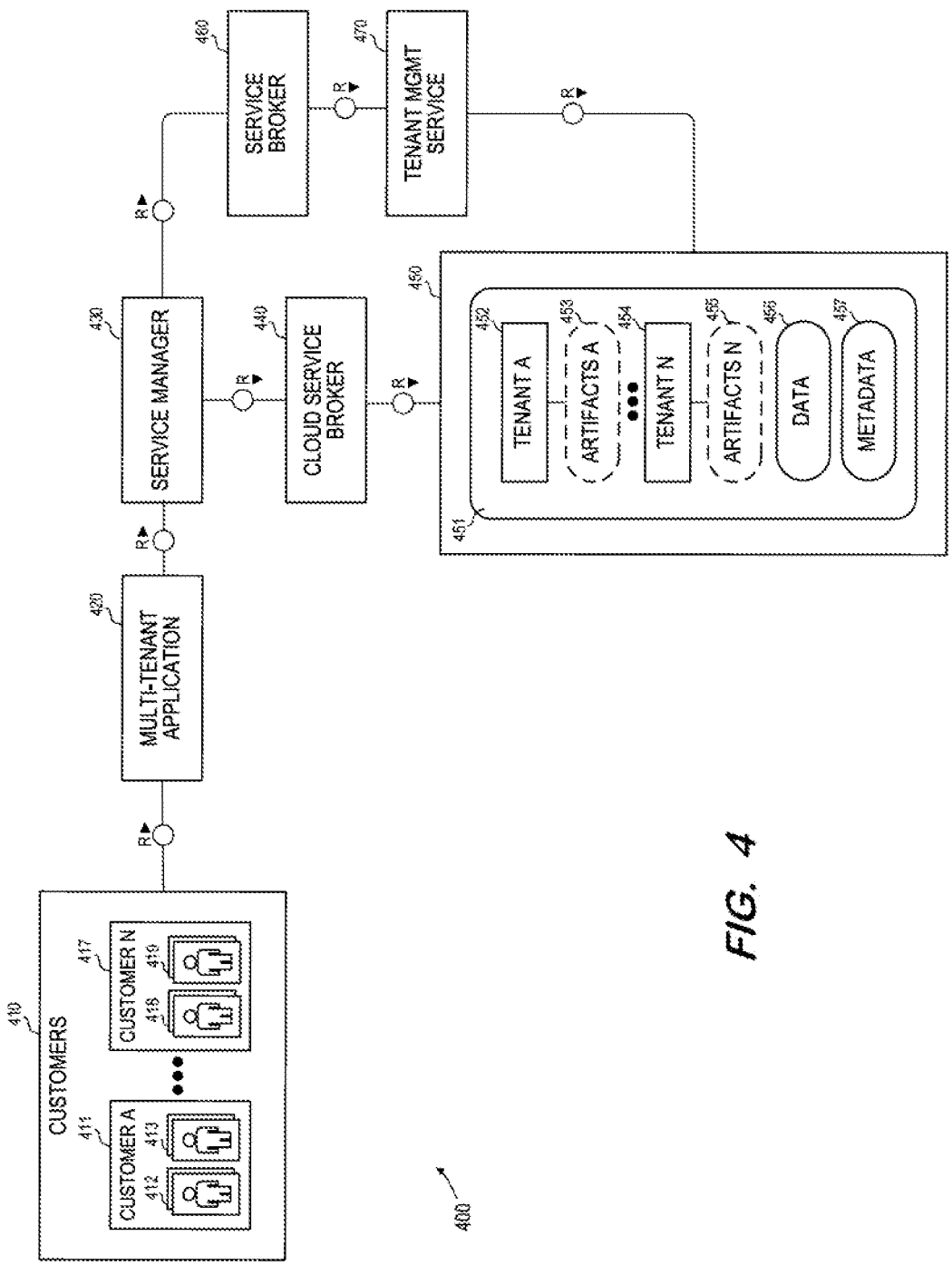
FIG. 4 is a block diagram of a database system providing native multi-tenancy according to some embodiments.

FIG. 4 is a block diagram of system 400 providing native multi-tenancy according to some embodiments. Database instance 450 includes tenant object instances 452 and 454 associated with artifacts 453 and 455 as described above. The data engines and persistence of database instance 450 have been omitted from FIG. 4 for clarity.

Figure 5:
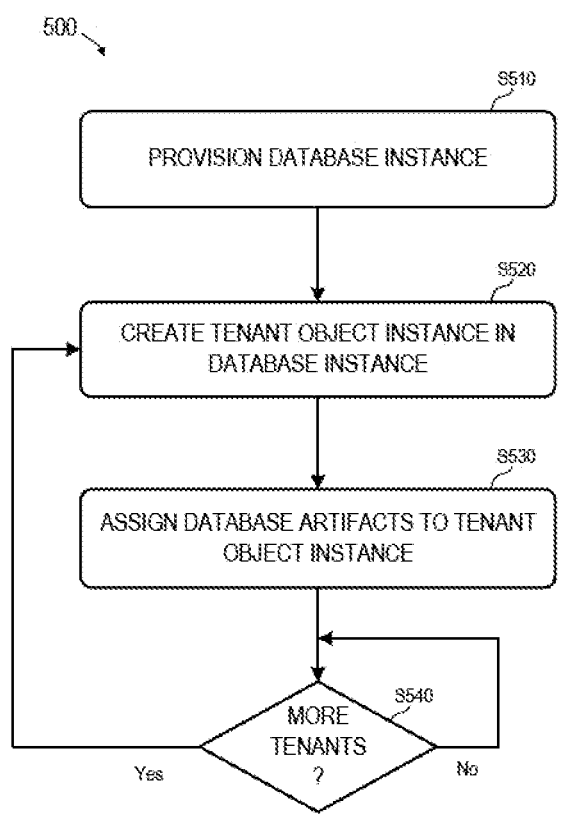
FIG. 5 is a flow diagram of a process to create tenants in a cloud database instance according to some embodiments.

Each tenant instance of database instance 450 corresponds to a respective one of customers 410. Customer A 411 includes key users 412 and business users 413, and customer N 417 includes key users 418 and business users 419. FIG. 5 comprises a flow diagram of process 500 to provision a database instance and create tenant instances therein as shown in FIG. 4 and according to some embodiments.

Process 500 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

The database instance in which the tenants are to reside is initially provisioned at S510. Referring to the FIG. 4 example, a key user 412 may access multi-tenant application 420 to request provisioning of a database instance. This request is forwarded to service manager 430 and to cloud service broker 440. Cloud service broker 440 then provisions database instance 450 as a cloud-based resource at S520.

A tenant object instance is created in the database instance at S520. Continuing the above example, a key user 412 may access multi-tenant application 420 to request creation of a tenant on database instance 450. This request is forwarded to service manager 430, to service broker 460, and to tenant management service 470. Tenant management service 470 then instructs database instance 450 to create tenant A instance 452 based on a tenant object defined in metadata 457. Tenant A instance 452 may be identified by a tenant ID which is known to database instance 450 and multi-tenant application 420.

Next, at S530, database artifacts are assigned to the tenant instance created at S520. For example, multi-tenant application 420 requests tenant management service 470 to instruct database instance 450 to associate tenant A instance 452 with artifacts A 453. The key user 412 may have previously operated multi-tenant application 420 and service broker 460 to define artifacts A 453 within data 456 and metadata 457 of database instance 450. Although created by service broker 460, all database artifacts are managed by multi-tenant application 420.

Some embodiments may use a deployment infrastructure to define database artifacts to assign to a tenant instance. The deployment infrastructure may provide a declarative approach for defining database objects (e.g., as design-time artifacts) using containers. For example, service broker 460 may create a container which corresponds to a database schema and additional metadata (e.g., user, roles, privileges) which may then be assigned to a tenant instance. Such containers may be isolated from each other by schema-level access privileges. Application 420 can access any database object in the database schema of the container by using an assigned per-schema technical database user.

Flow cycles at S540 until a command is received to create another tenant in the database instance. For example, a key user 418 of customer N 417 may access multi-tenant application 420 to request creation of a tenant on database instance 450. This request is forwarded to service manager 430, to service broker 460, and to tenant management service 470, which instructs database instance 450 at S520 to create tenant N instance 454. At S530, multi-tenant application 420 further instructs tenant management service 470 to assign previously-defined artifacts N 455 to tenant N instance 454.

After provisioning database instance 450 and creating tenants 452 and 454, multi-tenant application 420 may, for example, receive input from a business user 413 of customer A 411. In response, application 420 directs any resulting queries to database instance 450 via tenant management service 470 and identifies tenant A 452. Database instance 450 responds to the queries based on artifacts A 453 of tenant instance A 452. In a case that multi-tenant application 420 receives input from a business user 419 of customer N 417, any resulting queries are directed to database instance 450 and responded to based on artifacts N 455 of tenant instance N 454.

Figure 6:
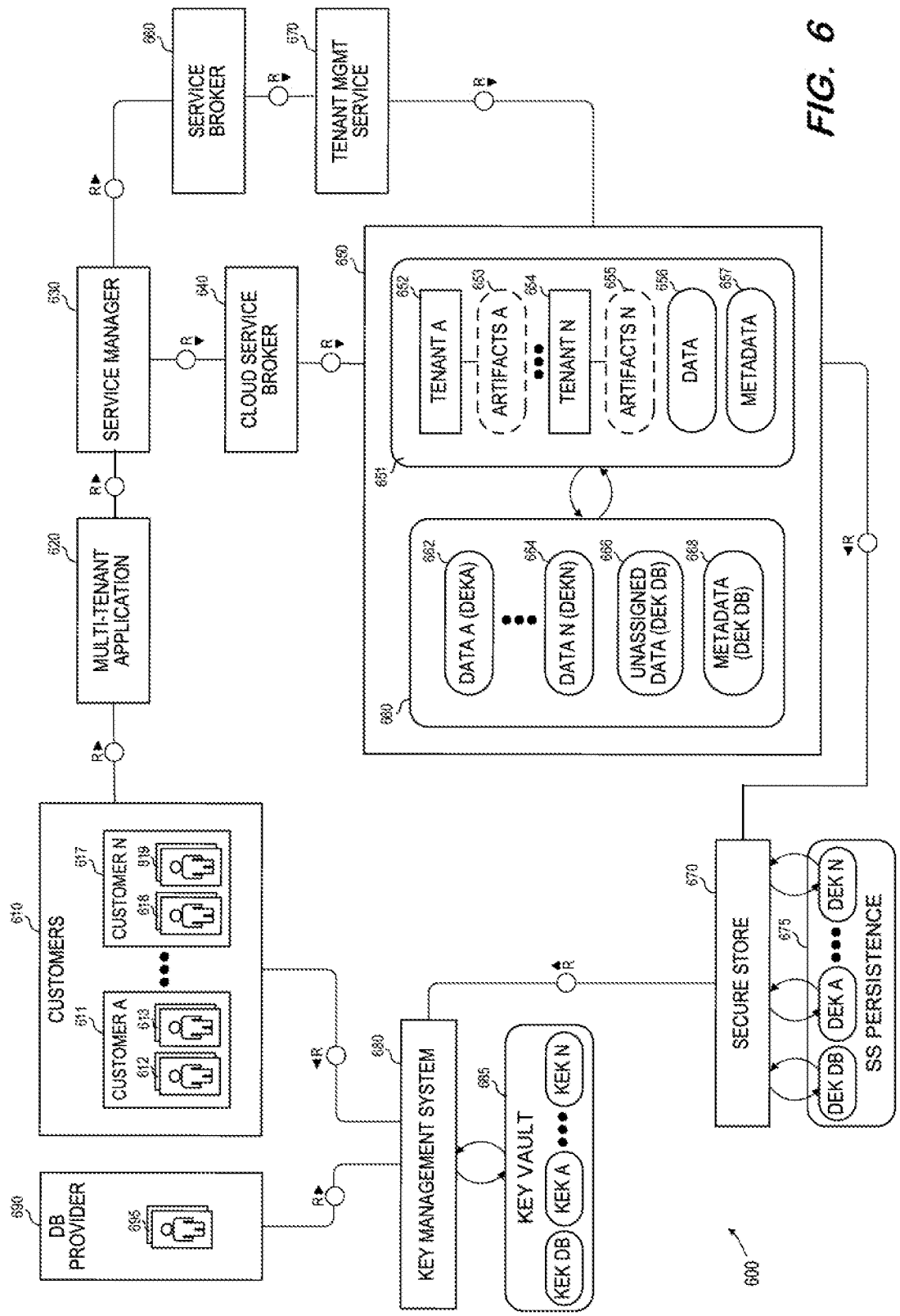
FIG. 6 is a block diagram of a database system providing native multi-tenancy and tenant-level encryption according to some embodiments.

FIG. 6 is a block diagram of system 600 providing native multi-tenancy and tenant-level encryption according to some embodiments. The elements of system 600 which are similarly-numbered to elements of system 400 (i.e., 6xx vs. 4xx) may be implemented and operate similarly.

System 600 shows persistence 660 of database instance 650, which was omitted from FIG. 4. Persistence 660 may be implemented using any suitable storage system or systems. Persistence 660 stores data 662 of all objects associated with tenant A 652 and data 664 of all objects associated with tenant N 654. Persistence 660 also stores data 666 of instance 650 which is not assigned to a particular tenant, and metadata 668 of instance 650. Advantageously, and in contrast to prior systems, persisted data 662 and 664 are encrypted using encryption keys (i.e., data encryption key (DEK) A and DEK N) which are specific to their corresponding tenant (i.e., customer). Moreover, persisted unassigned data 666 and metadata 668 are encrypted using a database instance-specific encryption key (i.e., DEK DB).

Encrypted persisted data 662 and 664 includes data that are persisted in persistence 660 during savepoints, as well as tenant-specific redo log entries. Encrypted data 666 and metadata 668 may include all definitions of the objects in the database catalog (e.g., table names, schema names, column names etc.), database users, configurations, and tables/partitions that are not assigned to a tenant.

According to some embodiments, DEK DB is a public-private key pair generated as part of creation of database instance 650. Database system 650 uses the public key of DEK DB to encrypt data 665 and data 668 prior to storage in persistence 660. Database system 650 uses the private key of DEK DB to decrypt data 666 and data 668 if needed. In some embodiments, the private key of DEK DB is stored in secure store persistence 675 in encrypted form.

For example, a key user 695 of database instance provider 690 provides key encryption key (KEK) DB to key management system 680 for storage in key vault 685. KEK DB is used to encrypt the private key of DEK DB prior to storage thereof in secure store persistence 675. KEK DB may also comprise a private-public key pair, in which key vault 685 stores the private key of KEK DB while the corresponding public key is used to encrypt the private key of DEK DB prior to storage thereof in secure store persistence 675.

Accordingly, database system 650 requests the private key of DEK DB from secure store 670 when database system 650 wishes to decrypt data 666 or data 668. In response, secure store 670 requests key management system 680 to decrypt the stored encrypted private key of DEK DB using the private key of KEK DB. Database system 650 then uses the decrypted private key of DEK DB to decrypt the desired data of data 666 or data 668.

Similarly, DEK A may comprise is a public-private key pair generated during creation of tenant A 652. Database system 650 uses the public key of DEK A to encrypt data 662 prior to storage in persistence 660. Database system 650 uses the private key of DEK A is to decrypt data 662 if needed. In some embodiments, the private key of DEK A is stored in secure store persistence 675 in encrypted form.

A key user 612 of customer A 611 provides KEK A to key management system 680 for storage in key vault 685. KEK A is used to encrypt the private key of DEK A prior to storage thereof in secure store persistence 675. KEK A may comprise a private-public key pair, in which key vault 685 stores the private key of KEK A while the corresponding public key is used to encrypt the private key of DEK A prior to storage thereof in secure store persistence 675.

Database system 650 requests the private key of DEK A from secure store 670 when database system 650 wishes to decrypt data 662. In response, secure store 670 requests key management system 680 to decrypt the stored encrypted private key of DEK A using the private key of KEK A. The request may be issued to an account of key management system 680 which is specific to customer A 611. Database system 650 then uses the decrypted private key of DEK A to decrypt the desired data of data 662. Accordingly, if customer A revokes KEK A from key vault 685, database provider 690 cannot decrypt stored private key DEK A and, consequently, cannot decrypt data 662. The foregoing process may occur in the case of each newly-created tenant N.

A customer may log in to key management system 680 to monitor their keys and to revoke individual keys. If a key is revoked, the corresponding secure store 670 will no longer be able to open corresponding payloads. Secure store 670 may then decline all future requests from database system 650 which refer to this tenant.

Architecture 600 may provide additional encryption not described herein. For example, data transmitted to and from database instance 650 from a client may be encrypted in transit using TLS/SSL. Moreover, individual table columns in non-persistent memory 651 may be encrypted using known techniques (e.g., using client-controlled keys).

Figure 7:
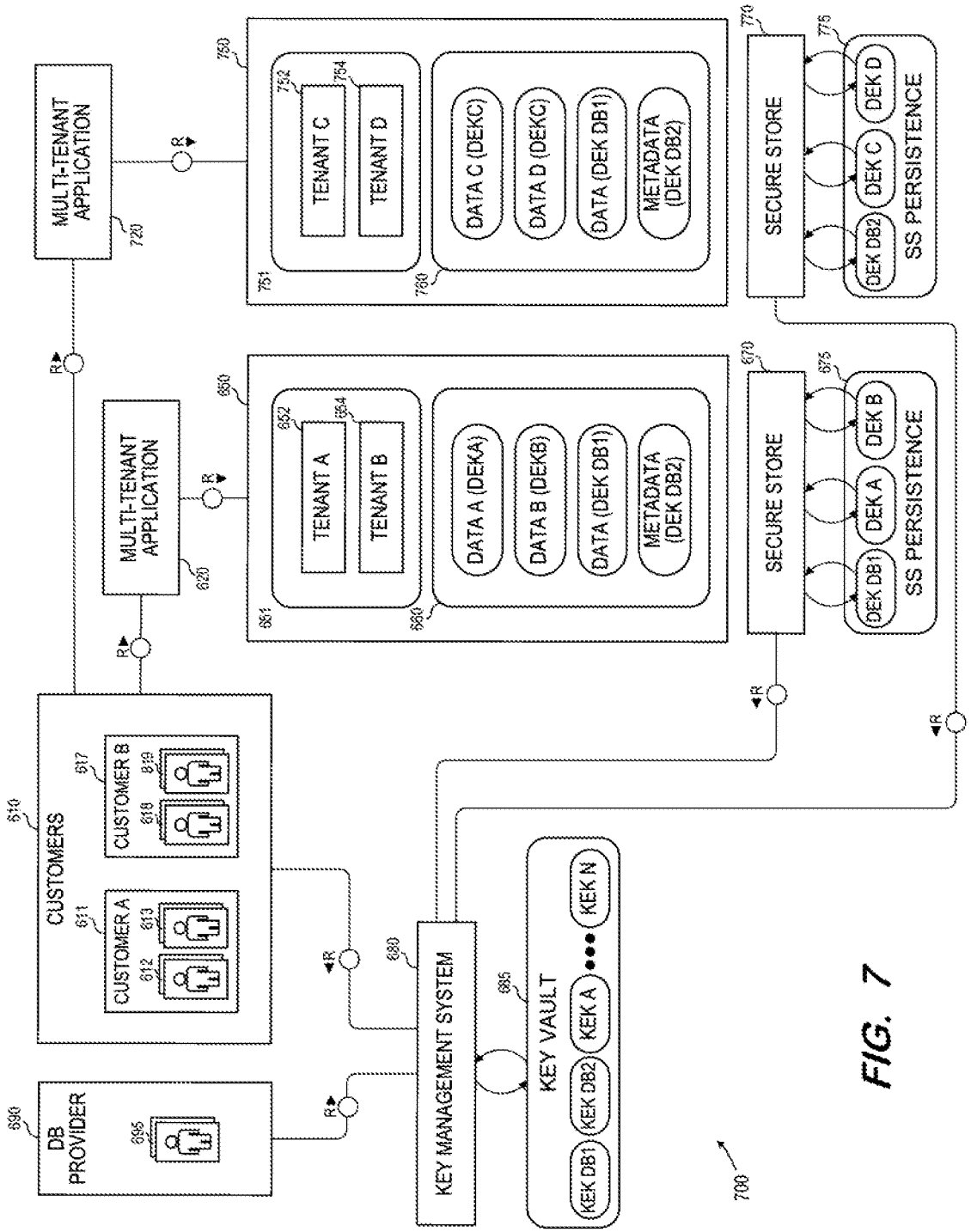
FIG. 7 is a block diagram of a database system providing native multi-tenancy and tenant-level encryption according to some embodiments.

FIG. 7 is a block diagram of architecture 700 including multi-tenant application 620 and multi-tenant application 720. Multi-tenant application 620 is in communication with database instance 650 as described above, and multi-tenant application 720 is in communication with database instance 750. According to the example, tenant A 652 of database instance 650 and tenant C 752 of database instance 750 are both associated with customer A 611 and tenant B 654 of database instance 650 and tenant D 754 of database instance 750 are both associated with customer B 617.

In other words, a user 613 of customer A 611 accessing application 620 interacts with the database artifacts associated with tenant A 652 of database instance 650, and a user 613 of customer A 611 accessing application 720 interacts with the database artifacts associated with tenant C 752 of database instance 750. Similarly, a user 619 of customer B 617 accessing application 620 interacts with the database artifacts associated with tenant B 654 of database instance 650, and a user 619 of customer B 617 accessing application 720 interacts with the database artifacts associated with tenant D 754 of database instance 750.

Each database instance 650 and 750 is associated with a respective DEK (i.e., DEK DB1 and DEK DB2) for encrypting its metadata and unassigned data as described above. The at-rest data of each tenant of each database system is also encrypted using a dedicated DEK as described above. Accordingly, each customer may provide a separate KEK for each tenant of each database system with which the customer is associated. For example, a key user 612 of customer A 611 provides KEK A for use in decrypting DEK A used by database system 650 for data associated with tenant A 652, and provides KEK C for use in decrypting DEK C used by database system 750 for data associated with tenant C 752. Customer A 611 may manage (e.g., revoke) each provided KEK independently.

According to some embodiments, a same KEK may be used for two or more DEKs associated with same customer. For example, a key user 612 of customer A 611 may provide KEK A for use in decrypting DEK A used by database system 650 for data associated with tenant A 652, and for use in decrypting DEK C used by database system 750 for data associated with tenant C 752. Accordingly, revocation of KEK A in such an implementation would result in an inability of architecture 700 to decrypt data associated with tenant A 652 or with tenant C 752.

By default, a key page stores all the DEKs, and the key page is encrypted with the database instance-specific encryption key (i.e., DEK DB). Similarly, all log entries are encrypted by default with a log root key (not shown). Accordingly, customer-specific keys are used to encrypt customer-specific data, and the database instance-specific key and the log root key are used to encrypt all other data.

All tenant-specific key data is encrypted with a tenant-specific key before being written to disk and must be decrypted before being provided to the upper-layer database engines. An encryption context is therefore provided and persisted for all tenant data. The encryption context may specify a tenant and applies to the payload of the data. Auxiliary data such as page headers, etc. that do not contain sensitive data will be encrypted with the default database instance-specific encryption key. Accordingly, the system is able to perform operations such as savepointing, data volume shrinking and garbage collection without requiring tenant-specific keys (since these operations do not read or modify the encrypted payload data). Using data volume encryption for page headers also assures that the initialization vector cannot be reconstructed from the page header.

A key management system stores versions of keys to support database snapshots. For example, at the beginning of a savepoint, the current persistence root keys of all tenants are fetched, kept in memory and used to write the savepoint. At the start of a next savepoint, any key rotations or key revocations will be noticed. If a tenant-specific key was revoked, then the tenant is marked as disabled, the data that is assigned to this tenant is unloaded from memory, and the storage component is free to physically remove this data from persistence. If an application attempts to access data of a disabled tenant, the application will receive an error, clean up its own tables respective to this tenant and call a procedure to remove all of the tenant's data from the persistence.

A backup transparently moves data from the persistence component and optionally encrypts this data with an additional key. Since tenant-level encryption is preserved during backup and restore, tenant-specific key management is not needed during these operations. It is possible to restore from older backups after tenant-specific key changes because the page headers include tenant IDs and the key management system is aware of the history of tenant-specific key changes.

Once a tenant-specific key has been revoked, the respective tenant and all associated data are unrecoverable from the persistence. If a customer decides to undo the key revocation, the data associated with the respective tenant must be restored from a backup.

It is desirable for the database to identify key revocations as soon as possible. Since the key management system does not call into the local secure store or the database, the local secure store polls the key management system to determine whether any keys have been revoked. To avoid hundreds of polls out of one local secure store installation supporting hundreds of tenants, the key management system may provide a grouping mechanism that allows a local secure store to acquire updates for all of its tenants in a few calls.

Similarly, the local secure store cannot call into the database. The database therefore polls the local secure store, again as a mass operation for all its tenants. If the database determines that a for a tenant was revoked at the key management system, it can clear the key cache for this tenant, mark the group as "DEAD", e.g., and begin erasing all associated data.

Figure 8:
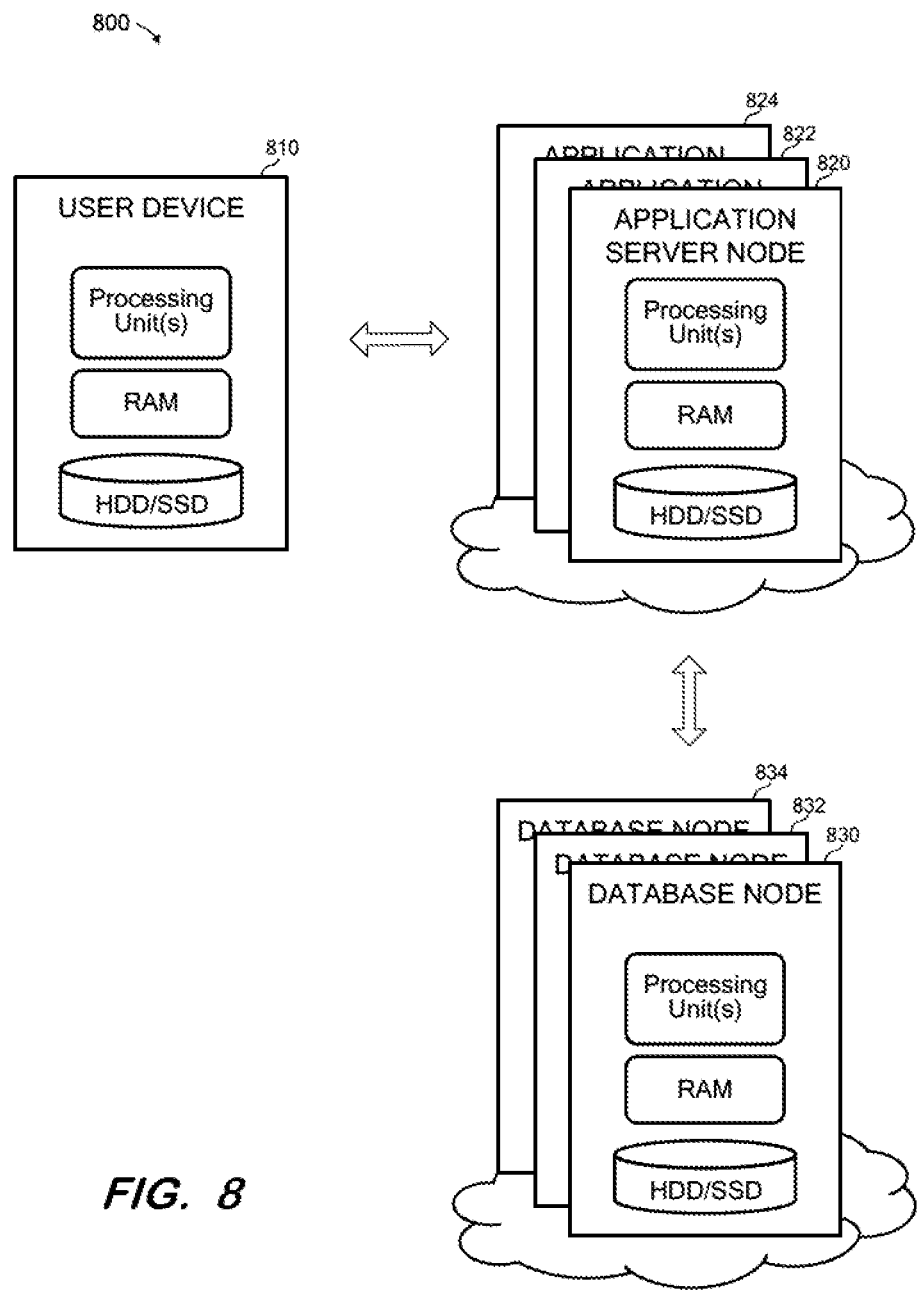
FIG. 8 is a block diagram of a cloud-based system according to some embodiments.

FIG. 8 illustrates cloud-based database deployment 800 according to some embodiments. User device 810 may comprise any suitable computing system operable by a key user or a business user to access a cloud-based multi-tenant application. User device 810 may store and execute program code of a Web browser to access a Uniform Resource Locator (URL) associated with a login page of such a multi-tenant application. The Web browser may download and execute program code of a client-side component of a multi-tenant application as is known in the art.

Application server nodes 820, 822 and 824 may host a multi-tenant application according to some embodiments. Database nodes 830, 832 and 834 may host one or more database instances accessible to the multi-tenant application and providing native multi-tenancy as described herein. Each node of deployment 800 may comprise a separate physical machine or a virtual machine. Such virtual machines may be allocated by a cloud provider providing self-service and immediate provisioning, autoscaling, security, compliance and identity management features.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A database system comprising:
   a persistent storage system;
   a memory storing:
      metadata defining a tenant object and a plurality of database artifacts;
      a first instance of the tenant object, the first instance associated with a first plurality of the database artifacts including first data associated with the first instance of the tenant object; and
      a second instance of the tenant object, the second instance associated with a second plurality of the database artifacts including second data associated with the second instance of the tenant object; and
   a processing unit to execute program code of a database instance to cause the database system to:
      encrypt the first data associated with the first instance of the tenant object using a first public encryption key and store the encrypted first data in the persistent storage system; and
      encrypt the second data associated with the second instance of the tenant object using a second public encryption key and store the encrypted second data in the persistent storage system.

2. A system according to claim 1, the program code executable to cause the database system to:
   encrypt the metadata using a third public encryption key and store the encrypted metadata in the persistent storage system.

3. A system according to claim 2, the program code executable to cause the database system to:
   encrypt third data not associated with the first instance of the tenant object or the second instance of the tenant object using the third public encryption key and store the encrypted third data in the persistent storage system.

4. A system according to claim 1, wherein encryption of the first data comprises encrypting data payloads of data pages of the first data and not encrypting header data of the data pages,
  wherein the header data of the data pages includes an identifier associated with the first instance of the tenant object.

5. A system according to claim 4, further comprising:
  a key management system storing a first customer public key, a first customer private key corresponding to the first customer public key, a second customer public key and a second customer private key corresponding to the second customer public key; and
  a secure store storing the first public encryption key, the second public encryption key, a first encrypted private encryption key corresponding to the first public encryption key and encrypted by the first customer public key, and a second encrypted private encryption key corresponding to the second public encryption key and encrypted by the second customer public key,
  the program code executable to cause the database system to:
  identify a plurality of the data pages of the stored encrypted first data;
  determine the first private encryption key based on the identifier included in the header data of the plurality of the data pages; and
  request the first private encryption key from the secure store,
  wherein, in response to the request, the secure store transmits the first encrypted private encryption key to the key management system, the key management system decrypts the first encrypted private encryption key using the first customer private key and transmits the first private encryption key to the secure store, and the database instance decrypts a portion of the stored encrypted first data using the first private encryption key.

6. A system according to claim 4, the program code executable to cause the database system to:
  determine that the first customer private key has been revoked; and
  in response to the determination, delete the data pages of the first data.

7. A system according to claim 1, further comprising:
  a key management system storing a first customer public key, a first customer private key corresponding to the first customer public key, a second customer public key and a second customer private key corresponding to the second customer public key; and
  a secure store storing the first public encryption key, the second public encryption key, a first encrypted private encryption key corresponding to the first public encryption key and encrypted by the first customer public key, and a second encrypted private encryption key corresponding to the second public encryption key and encrypted by the second customer public key,
  wherein, in response to a request from the database instance for the first private encryption key, the secure store transmits the first encrypted private encryption key to the key management system, the key management system decrypts the first encrypted private encryption key using the first customer private key and transmits the first private encryption key to the secure store, and the database instance decrypts a portion of the stored encrypted first data using the first private encryption key.

8. A method comprising:
  storing, in a memory:
    metadata defining a tenant object and a plurality of database artifacts;
    a first instance of the tenant object;
    a first plurality of the database artifacts associated with the first instance and including first data associated with the first instance of the tenant object;
    a second instance of the tenant object; and
    a second plurality of the database artifacts associated with the second instance and including second data associated with the second instance of the tenant object; and
  encrypting the first data associated with the first instance of the tenant object using a first public encryption key and storing the encrypted first data in a persistent storage system; and
  encrypting the second data associated with the second instance of the tenant object using a second public encryption key and store the encrypted second data in the persistent storage system.

9. A method according to claim 8, further comprising:
  encrypting the metadata using a third public encryption key and storing the encrypted metadata in the persistent storage system.

10. A method according to claim 9, further comprising:
  encrypting third data not associated with the first instance of the tenant object or the second instance of the tenant object using the third public encryption key and storing the encrypted third data in the persistent storage system.

11. A method according to claim 8, wherein encrypting the first data comprises encrypting data payloads of data pages of the first data and not encrypting header data of the data pages,
  wherein the header data of the data pages includes an identifier associated with the first instance of the tenant object.

12. A method according to claim 11, further comprising:
  identifying a plurality of the data pages of the stored encrypted first data;
  determining a first private encryption key based on the identifier included in the header data of the plurality of the data pages;
  requesting the first private encryption key from a secure store,
  transmitting, from the secure store, the first encrypted private encryption key to a key management system;
  decrypting, by the key management system, the first encrypted private encryption key using a first customer private key stored by the key management system and transmitting the decrypted first private encryption key to the secure store; and
  decrypting a portion of the stored encrypted first data using the first private encryption key.

13. A method according to claim 11, further comprising:
  determining that the first customer private key has been revoked; and
  in response to the determination, deleting the data pages of the first data.

14. A method according to claim 8, further comprising:
  receiving a request for a plurality of the data pages of the stored encrypted first data;
  determining a first private encryption key associated with the plurality of the data pages;
  requesting the first private encryption key from a secure store, transmitting, from the secure store, the first encrypted private encryption key to a key management system;

decrypting, by the key management system, the first encrypted private encryption key using a first customer private key stored by the key management system and transmitting the decrypted first private encryption key to the secure store; and decrypting the plurality of the data pages of the stored encrypted first data using the first private encryption key.

15. A non-transitory computer-readable medium storing program code executable by one or more processing units to cause a computing system to:

store, in a memory:
- metadata defining a tenant object and a plurality of database artifacts;
- a first instance of the tenant object;
- a first plurality of the database artifacts associated with the first instance and including first data associated with the first instance of the tenant object;
- a second instance of the tenant object; and
- a second plurality of the database artifacts associated with the second instance and including second data associated with the second instance of the tenant object; and encrypt the first data associated with the first instance of the tenant object using a first public encryption key and storing the encrypted first data in a persistent storage system; and encrypt the second data associated with the second instance of the tenant object using a second public encryption key and store the encrypted second data in the persistent storage system.

16. A medium according to claim 15, the program code executable by one or more processing units to cause a computing system to:

encrypt the metadata using a third public encryption key and store the encrypted metadata in the persistent storage system.

17. A medium according to claim 16, the program code executable by one or more processing units to cause a computing system to:

encrypt third data not associated with the first instance of the tenant object or the second instance of the tenant object using the third public encryption key and store the encrypted third data in the persistent storage system.

18. A medium according to claim 15, wherein encryption of the first data comprises encrypting data payloads of data pages of the first data and not encrypting header data of the data pages, wherein the header data of the data pages includes an identifier associated with the first instance of the tenant object.

19. A medium according to claim 18, the program code executable by one or more processing units to cause a computing system to:

identify a plurality of the data pages of the stored encrypted first data;

determine a first private encryption key based on the identifier included in the header data of the plurality of the data pages;

request the first private encryption key from a secure store, transmit, from the secure store, the first encrypted private encryption key to a key management system;

decrypt, by the key management system, the first encrypted private encryption key using a first customer private key stored by the key management system and transmitting the decrypted first private encryption key to the secure store; and decrypt a portion of the stored encrypted first data using the first private encryption key.

20. A medium according to claim 15, the program code executable by one or more processing units to cause a computing system to:

receive a request for a plurality of the data pages of the stored encrypted first data;

determine a first private encryption key associated with the plurality of the data pages;

request the first private encryption key from a secure store, transmit, from the secure store, the first encrypted private encryption key to a key management system;

decrypt, by the key management system, the first encrypted private encryption key using a first customer private key stored by the key management system and transmitting the decrypted first private encryption key to the secure store; and decrypt the plurality of the data pages of the stored encrypted first data using the first private encryption key.

* * * * *